(12) United States Patent
Kondo et al.

(10) Patent No.: US 6,942,915 B1
(45) Date of Patent: Sep. 13, 2005

(54) FRP ROOFING MATERIAL, MANUFACTURING METHOD, AND ITS CONNECTING STRUCTURE AND CONNECTING METHOD

(75) Inventors: Toshiyuki Kondo, Ehime (JP); Toshihiro Ito, Shiga (JP); Masashi Matsuura, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/700,060

(22) PCT Filed: Mar. 16, 2000

(86) PCT No.: PCT/JP00/01594

§ 371 (c)(1),
(2), (4) Date: Nov. 9, 2000

(87) PCT Pub. No.: WO00/56993

PCT Pub. Date: Sep. 28, 2000

(30) Foreign Application Priority Data

Mar. 19, 1999 (JP) .................................. 11/074722

(51) Int. Cl.[7] .......................... B32B 3/12; B32B 3/20; B32B 3/00; E04C 2/34; E04C 2/52
(52) U.S. Cl. ................... 428/174; 428/178; 428/188; 428/131; 428/137; 52/793.1; 52/220.2
(58) Field of Search ............................... 428/178, 188, 428/131, 137; 52/793.1, 220.2

(56) References Cited

U.S. PATENT DOCUMENTS

| | | | | |
|---|---|---|---|---|
| 3,920,871 | A | * | 11/1975 | Johnson ....................... 428/54 |
| 4,078,348 | A | * | 3/1978 | Rothman ..................... 52/309.7 |
| 4,232,494 | A | * | 11/1980 | Bauch et al. ................. 174/48 |
| 4,361,613 | A | * | 11/1982 | Bogner et al. ............... 428/119 |
| 4,730,428 | A | * | 3/1988 | Head et al. ............... 52/309.11 |
| 5,678,369 | A | * | 10/1997 | Ishikawa et al. ........... 52/309.9 |
| 5,706,620 | A | * | 1/1998 | De Zen ...................... 52/220.2 |
| 5,729,944 | A | * | 3/1998 | De Zen ......................... 52/439 |
| 5,849,393 | A | * | 12/1998 | Slattery ....................... 428/172 |
| 5,928,772 | A | * | 7/1999 | Shiraishi et al. ......... 428/297.4 |
| 5,979,684 | A | * | 11/1999 | Ohnishi et al. ............... 220/1.5 |
| 6,247,747 | B1 | * | 6/2001 | Kawanomoto et al. ..... 296/191 |
| 6,309,732 | B1 | * | 10/2001 | Lopez-Anido et al. ...... 428/178 |

FOREIGN PATENT DOCUMENTS

| | | | | |
|---|---|---|---|---|
| EP | 0453598 | A1 * | 10/1991 | ............ D06N 5/00 |
| GB | 2177139 | A * | 1/1987 | ............ E04B 7/08 |
| JP | 08193409 | A * | 7/1996 | |
| JP | 09202145 | A * | 8/1997 | |
| JP | 10281462 | | * 4/2000 | ............ B32B 5/00 |

* cited by examiner

*Primary Examiner*—Harold Pyon
*Assistant Examiner*—Catherine A. Simone
(74) *Attorney, Agent, or Firm*—Morrison & Foerster LLP

(57) ABSTRACT

This invention relates to fibre reinforced plastic ("FPR") roofing materials with a sandwich structure. A pair of sheets of FRP are arranged with a gap between them, and a rib structure which joins the sheets is interposed. Further, this invention relates to a method for producing FRP roofing material in which channels are provided in the core material and a reinforcing fibre impregnated with a resin is distributed through these channels. A preferred joint structure for the roofing material is to use butt joints and to provide a connecting layer extending across the surfaces of both ends of the sandwich structures. A layer containing a resin distribution medium is provided between the abutting end faces. This invention overcomes various problems of conventional joint structures, permitting the ends of the sandwich structures to be easily, firmly and cheaply joined together, ensuring high joint strength and rigidity, while achieving excellent appearance.

27 Claims, 11 Drawing Sheets

(A)

(B)

(C)

(D)

(E)

FRP ROOFING MATERIAL, MANUFACTURING METHOD, AND ITS CONNECTING STRUCTURE AND CONNECTING METHOD

TECHNICAL FIELD

The present invention relates to an FRP roofing member and manufacturing method, and connecting structure and a connecting method therefor, and, in particular, it relates to an FRP roofing member of large area which is light in weight, has excellent installation characteristics, high durability and outstanding design properties, and which can also be connected together.

TECHNICAL BACKGROUND

Hitherto, for constructing roofs or the eaves thereof, etc, roofing materials comprising a metal material such as a zigzag folded sheet affixed to a steel frame-based framework or roofing materials formed using concrete have been common, but where the chief structural material is a metal there is the problem of deterioration due to rusting. Furthermore, since such roofing materials are composed of metal or concrete, they are heavy and, as well as this resulting in installation difficulties at the time of assembly, there are also, for example, disadvantages from the point of view of the earthquake resistance of the building when an earthquake occurs. With metal, concrete or the like, if the weight is reduced, it then becomes more difficult to ensure satisfactory strength and rigidity.

In particular, in the case of buildings of large area requiring a construction without pillars, for example gymnasia, large halls and the like, it is necessary to form a large span without the need for supporting pillars. Thus, it is necessary for the roofing material itself to have adequate strength and rigidity. Hitherto, in such applications, precast concrete formed by reinforcing concrete with steel reinforcements has been employed. A method using, for example, approximately 24 m long precast concrete units as the roofing material is well known for gymnasia roofs. However, in the case of precast concrete, the weight per unit area is very great, at approximately 250 kg/m$^2$, so as well as installation being difficult there is also the problem that the effects on the base structure at the time of an earthquake are considerable, making it necessary for the building to have an unyielding base structure.

Furthermore, in the case of a roofing material construction where there has been affixed a metal material comprising a flat sheet or zigzag folded sheet, shaping into a curved surface or into a three-dimensional form is difficult, so there are considerable design limitations and there are restrictions in terms of improving the design by shaping the roofing material into a desired form.

Now, while FRP materials have been used hitherto for ships and other such large structures, practically no investigations have been conducted into their application as building materials with the exception of studies into their use merely as interior decorative materials or the like. This is because FRP constructions in the shape of large structures have not been investigated in forms suitable as building materials and because associated factors relating to building materials, for example the fire-resistance and joint structures, etc, have not been fully investigated.

Furthermore, with regard to the method of forming a large structural material from an FRP, while there is the conventionally-known hand lay-up method, since the resin impregnation of the reinforcing fibre is carried out by hand in this method, the proportion of resin to reinforcing fibre in the FRP is very high and it is not possible to utilize the physical properties of the reinforcing fibre efficiently. Moreover, because the resin is handled in the open, there are considerable problems in terms of the environment.

As a means for overcoming the above there is, for example, the RTM method where the resin is injected into a moulding tool in which reinforcing fibre has already been set, but there are problems in that it is necessary to apply pressure to the moulding tool and a very expensive moulding tool is required. Furthermore, as an improvement to the RTM method, in U.S. Pat. No. 5,721,034, for example, there is proposed a method where, by cutting channels of different cross-sectional area in the core material from which the sandwich panel is composed and by injecting resin into the core material channels under vacuum, an FRP of large area is efficiently formed. However, because injection is carried out under vacuum in this method, it is necessary for the resin used to be of low viscosity. In the case of the phenolic resins which are particularly suitable for use in building material applications, it is difficult to obtain large integrally-moulded items using the above method.

Now, in order to join FRP members one to another, there is normally used the so-called lap joint technique where sheets of the same kind of material or metal sheets are arranged on the upper and lower surfaces of the FRP members and these then fastened by means of bolts or the like which pass through the FRP members. Furthermore, in another method, the FRP members are joined to one another using an adhesive. Again, there is also employed a method in which a metal frame is used as a base, with the FRP members lined-up on top thereof.

However, when joining FRP members to one another, in the case of the method of fastening using sheets arranged on the upper and lower surfaces as described above, it is necessary to provide holes in the FRP members passing through in their thickness direction, so problems arise in that the inherent strength of the FRP members is lowered and there is a risk of leaks occurring when used as a roofing material.

As examples of the above problem, there are cases where the bolting is carried out by means of through-holes or embedded metallic sleeves provided in the FRP member itself, as disclosed in JP-A-5-69487 and JP-A-9-32914. In structural terms, the joint strength in these examples depends primarily on the bearing strength of the FRP member and the bolt shearing strength. Generally speaking, an FRP is an anisotropic material based on the fibre orientation and, while its tensile strength is very high in the direction of fibre orientation, its compressive and shearing strengths are low. Thus, in the aforesaid joining method, the joint strength is governed by the compressive and shearing strengths of the FRP, and so large loads cannot be sustained.

As a method for resolving this problem, there is disclosed in JP-A-8-333807 a method where an FRP member is inserted in an opening and, furthermore, there is provided a metallic sleeve in which the FRP member is inserted and, after insertion of the member, a shaft is passed through the metallic sleeve. By this method, there is formed a structure where the shearing force and bending moment generated in the region of the joint are mitigated. However, when bending and tensile loads are applied, in addition to a compressive force acting on the FRP layer at the opening, sometimes a shearing force is produced in the embedded metal sleeve portion and a bearing pressure is produced on the FRP member, with the result that stress concentrations in these regions govern the joint strength.

On the other hand, in the case of joining using an adhesive, because the joining operation to assemble an FRP roof structure for example is generally an outdoor operation, the joining is very difficult to carry out reliably under such circumstances.

Furthermore, when carrying out re-roofing due to the deterioration of an existing roof such as that of a gymnasium, in order to protect the building itself from weather conditions of various kinds, there must be provided a temporary roof, and the provision of a temporary roof during prolonged work is both a technical problem and a problem in terms of cost.

As stated above, with regard to roofing material applications, in particular roofing materials for a large structure, hitherto there has been no use at all of FRPs.

Thus, the problems addressed by the present invention are the structure of an FRP roofing material to provide an FRP roofing member to replace conventional metallic and concrete roofing members; a method for the production thereof; the joint structure for such FRP roofing material; and the joining method.

DISCLOSURE OF THE INVENTION

In order to resolve the aforementioned problems, basically the present invention has the following constitution. Specifically, regarding the structure of the FRP roofing material, this is

[FRP roofing material which is characterized in that it is a sandwich structure where a pair of sheets comprising FRP is arranged with a gap between them, and a rib structure which joins said pair of sheets is interposed];

regarding the production method thereof, this is

[a method of producing FRP roofing material where, in an RTM moulding method where channels are provided in the core material and the reinforcing fibre impregnated with a resin distributed through these channels, there is used an RTM moulding method employing a core material having through-holes];

regarding the joint structure for the FRP roofing material, this is

[a joint structure for FRP roofing material which is FRP roofing material where two or more FRP sandwich structures are butt joined and, as well as providing an FRP connecting layer extending across the surfaces of both ends of said sandwich structures, there is provided a layer containing a resin distribution medium between the abutting end faces]; and regarding the joining method therefor, this is

[an FRP roofing material joining method where, when butt joining the end regions, as well as arranging a resin distribution medium between the abutting end faces, reinforcing fibre is arranged across the surfaces of the two end regions and, with the area where the resin distribution medium and the reinforcing fibre are arranged being covered with an airtight material (a bag base material), a vacuum is applied to the interior and a resin injected into the resin distribution medium portion, and as well as distribution being effected as far as the reinforcing fibre region, there is impregnation of reinforcing fibre and, by curing the resin, the end regions are integrally joined].

BRIEF EXPLANATION OF THE DRAWINGS

FIG. 24 is an example where through-holes are provided.

FIG. 30 is an example where the embodiments in FIG. 28 and FIG. 29 are combined.

Figure 1:
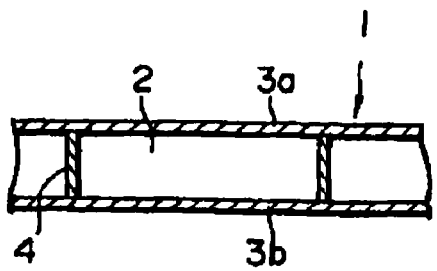
FIGS. 1-8 show partial sectional views of FRP roofing materials relating to practical embodiments of the present invention.

1, 41–43, 45: FRP roofing materials 2: gap 3a–i FRP sheets of various shapes (skin layers) 4: rib structure 4a–e: rib structures of various shapes 11: FRP roofing material 12, 51, 65: core materials 13: rigid frame [Rahmen] structure 14, 14a, 14b: connecting members 14c: sloping base 16, 16a universal joints 16b, 16c: pins 17 opening 18: window frame member 19: window glazing material 20: fire-resistant layer 44: three-dimensional curved surface 46: space 47: connecting member (e.g. bolt) 48: connection region 49: waterproof member 50: mould 52: reinforcing fibre base material 53: ⊃-shaped cap-form reinforcing fibre base material 54: channel 55: plurality of channels branching from a channel 56: through-hole 57: airtight material 58: vacuum pump 59: valve 60: liquid resin 61, 62: edge breathers 63: joined FRP roofing materials 64: individual FRP roofing materials 66: FRP skin sheet 67: end regions of the FRP roofing materials 68: FRP connecting layer 69: FRP roofing material abutting end faces 70: layer containing resin distribution medium 71, 72 resin distribution media 73: resin injection hole 74: resin flow channel 75: FRP layer 76: hollow region.

Optimum Form for Practising the Invention

The FRP roofing material of the present invention comprises a sandwich structure comprising a pair of FRP sheets and a rib structure interposed in the gap between the pair of sheets. The pair of sheets may have practically any thickness but, from the point of view of a balance between the FRP sheet properties and weight, the use of sheet with a thickness of between 2 mm and 10 mm is most favourable. There can be used FRP, metal or wood, etc, as the rib structure material. In order that the effects of the rib structure be manifested to a maximum extent, it is preferred that the sandwich structure top and bottom sheets and the ribs be integrally coupled.

The rib structure may be of any thickness sufficient to transmit stresses in the top/bottom sandwich panels but, if the rib structure is too thick, the weight of the sandwich structure is increased and the particular advantage of the FRP in being light in weight is lost. The most suitable thickness is from 1 mm to 3 mm.

In order to integrally couple the sandwich structure top and bottom sheets and the ribs, in the case where the ribs are wood or metal there is the method of performing moulding after having inserted the wood or metal, etc, into the sandwich structure. For example, first of all fibre substrate is placed in the moulding tool, then the wood, metal or the like for forming the ribs is arranged on top, and further fibre substrate placed thereon and, by injecting resin, it is possible to obtain a sandwich structure in which the ribs are integrally coupled. In such circumstances, in order to facilitate the flow of the resin at the surface of the wood, metal or the like, it is possible to provide channels for the resin to flow along in the surface of the wood or metal, etc.

In the case of FRP ribs these can be integrally produced, for example, by an identical procedure to that described above by arranging reinforcing fibre to form the ribs, after which resin is injected. In such circumstances, the reinforcing fibre used for the ribs may have any form but, in the case where forces which cause the sandwich structure to bend are applied, it is preferred in terms of the shear force produced that there be used a multi-axial woven material having a fibre direction at an angle of 45±10° to the rib lengthwise direction.

With regard to the dimension of the gap between the upper and lower sheets from which the aforesaid sandwich structure is formed, this gap may be substantially constant in the sheet lengthwise direction or it may vary. In the case of a building where the appearance and design of the roofing material is important, in order to achieve various shapes in accordance with the wishes of the designer, the gap between the upper and lower sheets may be varied.

Furthermore, the shape of the sheets themselves may be a simple flat shape but it is also possible for at least one of the sheets to be moulded, for example, in a jagged form in which peaks and troughs are alternately provided. Besides such peaks and/or troughs extending linearly in a given direction, moulding may also be carried out in a three dimensional fashion in the form of pyramids.

The gap in the sandwich structure can just be moulded in the form of an empty space but it is also possible to provide, in the gap, a filler material of specific gravity lower than that of the pair of sheets. The filler material may be of any kind which does not make the weight of the sandwich structure heavy, but a lightweight foam is favourably employed. Examples of the foam type are inorganic material foams such as lightweight blown concrete or a moulded body of pearlite, and foams of organic materials such as urethane, vinyl chloride, polyethylene, polypropylene, polystyrene, phenolic resins and the like. In the case of building materials in particular, it is preferred that there be used a material with outstanding resistance to burning and, for this, foams of inorganic materials, phenolic foams, and organic foams in which a flame retardant has been incorporated, are a favourably used.

Again, it is also possible to produce a structure in which there is fitted to the outer face of at least one of the sheets a connecting member for connection to some other member. A construction is preferred where the connecting member is fitted at a position corresponding to the position of a rib structure. It is preferred that this connecting member be one which has a universal joint in order to prevent torsion in the connecting member or in the FRP roofing material and in order to make possible connection to other members positioned in various directions.

The ratio of the overall thickness of the aforesaid sandwich structure to the thickness of the respective sheets making up the aforesaid pair of sheets may be of any value, providing that the characteristics as a roofing material are satisfied, but if the thickness of an FRP layer in terms of the overall thickness is too great, then the weight of the sandwich structure is increased and there is a resultant lowering of properties as a sandwich structure. Furthermore, where the amount of resin used is increased, there is an increase in terms of cost. Conversely, if the thickness of an FRP layer is too low, the properties of the skin layer are reduced, with the result that the properties of the sandwich structure are lowered. Thus, the preferred thickness ratio is between 5:1 and 25:1 and, in particular, by including in the FRP skin layer a thickness ratio of at least 5% of FRP layer comprising carbon fibre reinforced plastic, it is possible to construct a particularly favourable FRP roofing material of outstanding dimensional stability where the ratio of the overall thickness of the sandwich structure to the thickness of the respective sheets making up the pair of sheets is 10:1 to 20:1, and the weight of said sandwich structure is 30–65 kg/m$^2$.

Again, the weight of the FRP roofing material is not particularly restricted but in order to make the most of the particular advantage of FRP, namely its light weight, it is preferred that the unit weight of the FRP roofing material of the present invention be no more than 100 kg/m$^2$. Where the weight is light, as well as transportation and installation being facilitated, the load on the building following installation is also markedly reduced. Moreover, since the weight of the roof as a whole is considerably lightened, it is possible to lengthen the span between pillars and beams. Furthermore, large cranes and massive scaffolding become unnecessary and, as well as the installation time being shortened, installation costs can also be reduced.

The cross-sectional shape of the FRP roofing member of the present invention will depend on the FRP moulding tool used and, basically, it can be of any shape. Any of the shapes commonly used for a roofing material, such as a flat sheet shape, V shape, hat shape, W shape, inverted Y shape or corrugated shape can be favourably employed.

With a roofing material which extends in the lengthwise direction substantially at a constant width, a length of at least 10 m and a width of at least 1.5 m is preferred in order to make the most of the lightness of the FRP and to realize the advantages of being able to install a large area all in one go. In the case where the roofing material is moulded in the factory and transported to the site, a length of no more than 25 m and width of no more than 3.5 m is preferred because of transportation restrictions.

Any lengthwise direction shape may be employed but, for use as a roofing material, it is preferred that a slope enabling rainwater to run off be provided. Furthermore, in addition to the properties required as a roofing material, in particular the inherent rigidity of the FRP required to satisfy the level of flexure when there is fallen snow thereon, it is preferred that the lengthwise direction sectional shape be that of a rising convex circular arc to effectively utilize the effects of the shape. The radius of the arc is not particularly restricted but, in terms of ease of production, a radius of 50 m to 250 m is suitable.

With a roofing material extending in the lengthwise direction substantially at a constant width, a number of said roofing materials can readily be connected together particularly in the widthwise direction, and so even where the width of the individual FRP roofing materials is small, by linkage it is possible to construct a large-size roof easily. Consequently, while handling is enhanced at the time of transportation and installation when in the form of a comparatively small-size FRP roofing material, it is possible finally to achieve a large-size roof of large area and desired shape. As a result, the work involved can be markedly simplified not only in the case of a new building but also when replacing a roof.

Furthermore, since the exterior is moulded from FRP, basically the problem of the occurrence of rusting is eliminated and since the corrosion resistance is also excellent, markedly enhanced durability is possible and the practical life of the roof can be extended.

In terms of the properties as a roofing material, the degree of flexure when a normal snow load or wind load is applied is prescribed. In the case of the FRP roofing material relating to the present invention, by making the flexural rigidity per unit width (1 mm) at least $5 \times 10^7$ kg·mm$^2$, and in particular by making the flexural rigidity per unit width (1 mm) in the lengthwise direction at least $5 \times 10^7$ kg·mm$^2$, sufficiently high rigidity as a roofing structural member is ensured and the prescribed degree of flexure is satisfied. Again, by satisfying this flexural rigidity, in terms of the lightness of the FRP roofing material there is no need for a supporting member in the centre when the roofing material is supported at both ends, and use as a roofing material of span 10 m or more is possible. Moreover, in the case of a roofing material supported on one side (cantilever), use as a roofing material of span 3 m or more is possible.

With regard to the rib structure, various sectional shapes can be employed as described in the embodiments discussed below and, furthermore, construction is also possible as a truss or rigid frame (Rahmen) structure.

Again, openings passing through in the thickness direction may also be provided in the FRP roofing material relating to the present invention. If a window frame member is fitted in the opening, a window to give light can thus be provided at a specified location, or if an opening of specified shape is left as it is, then it is possible to form a ventilation hole in the roof of an open structure, etc.

In order to enhance the fire resistance it is preferred, in the FRP roofing material relating to the present invention, that the matrix resin of at least one of the sheets be a phenolic resin. As an essential property of a roofing material, it is necessary to ensure safety in respect of the spread of fire (safety in terms of flames from outside the building). The present inventors have discovered that by providing a phenolic resin FRP layer at the roof surface, the roofing material has properties which pass the leaping flame test (ISO test 12468 "Test method for external fire exposure to roofs"), which is a test to evaluate safety in terms of the spread of fire.

Glass fibre, aramid fibre, carbon fibre or the like is normally used as the reinforcing fibre of the FRP. In order to obtain a light FRP of high strength, the use of carbon fibre is most preferred but, taking into account a balance in terms of cost, a hybrid with glass fibre is practical. Furthermore, with regard to the form of the fibre employed, a cloth, a mat or the like can be favourably used. Regarding carbon fibre in particular, in order to raise the productivity at the time of moulding, use in the form of a woven material is preferred. A plain weave or a twill weave woven material is favourably used as the woven material. In order that the excellent properties of the carbon fibre be fully manifested, it is most preferred that there be used a so-called 'non-crimp' woven material in which there is little bending of the carbon fibres at the points of cross-over of the warp and weft yarns. Any type of carbon fibre having high strength and high modulus can be used as the carbon fibre employed but, in terms of producing lower cost moulded articles, there can be employed so-called 'large tow' carbon fibre.

Furthermore, if a fire-resistant material layer is provided on at least one face, the fire resistance properties are improved and it can be used favourably as a roofing material. Fire-resisting performance as roofing material is specified in Ministry of Construction Ordinance No. 2999, etc, and the present inventors have discovered that the test can be fully satisfied by providing a fire-resistant material layer. Any material which is fire-resistant may be employed as the material used in the fire-resistant layer but, in particular, a rock wool fibre blanket, a ceramic fibre blanket or a combination thereof can readily follow changes in shape, and so can be favourably used. It is also possible to use a hardened sheet of rock wool or a phenolic foam, etc.

For example, in the case where a 1 hour fire resistance test based on the test method in Ministry of Construction Ordinance No. 2999 is carried out, the test is passed by affixing to the FRP roofing material a rock wool layer of thickness at least 60 mm and density at least 60 kg/m$^2$, or a ceramic wool layer of thickness at least 25 mm and density at least 120 kg/m$^2$. Moreover, as an alternative structure for passing the 1 hour fire resistance test, there may be used a combination of a phenolic foam of thickness at least 30 mm and density at least 80 kg/m$^3$ and a rock wool hardened sheet of thickness at least 10 mm and density at least 30 kg.

Again, in the case of the 30 minute fire resistance, it is possible to pass the test by affixing a rock wool layer of thickness at least 40 mm and density at least 60/cm$^3$. Moreover, as an alternative structure for passing the 30 minute fire resistance test, there is the combination of a phenolic foam of thickness at least 30 mm and density at least 60 kg/m$^2$ and a rock wool hardened sheet of thickness at least 10 mm and density at least 20 kg.

Where a fire-resistant material layer is to be affixed, there can be employed a normal method such as using an adhesive agent, screwing, or a combination thereof. Furthermore, it is possible to provide a decorative layer on the surface of the fire-resistant material layer to improve the surface appearance thereof. For example, a polyester nonwoven material or a glass fibre woven fabric can be suitably used as the decorative layer.

As the method of producing this roofing material, there can be employed an ordinary FRP production method, for example the hand lay-up method, the RTM method, the SMC method or the like. The RTM method is favourably used, preferably with channels provided in the core material to facilitate distribution of the resin. In particular, in the case of a large size roofing member, for example a sandwich structure of surface area at least 10 m$^2$, it is possible to employ the RTM moulding method favourably by using a core material which has through-holes as well as providing channels in the core material.

The through-holes provided in the core material are extremely effective in achieving ready impregnation of the top/bottom skin sheets from which the sandwich panel is moulded, in a short time. Practically any size of through-holes may be provided in the core material, but it is preferred that the sum of the internal diameters of the through-holes be from 1/100 to 1/5000 of the area of the core material upper face or lower face. If the area of the through-holes is too great then, while this is convenient in terms of the passage of the resin, there is the disadvantage that the sandwich panel as a whole becomes very heavy following the moulding. On the other hand, if the area is too low, passage of the resin is impeded and there is a fear of un-impregnated regions at the moulding tool face. With regard to the number of through-holes, from 1 to 50 per 1 m² is preferred.

With regard to the phenolic resin which is favourably used from the point of view of heat resistance and flame retardance in building material applications in particular, generally speaking, when compared to the unsaturated polyester resins and vinyl ester resins used in FRP moulding, the viscosity is high and resin distribution and impregnation of the reinforcing fibre are difficult and, moreover, there is also the disadvantage that control of the gelation time is extremely difficult. Hence, in the case of moulding using a phenolic resin, it is necessary that the entire reinforcing fibre be impregnated by the resin as rapidly as possible. Consequently, a moulding method employing through-holes in the core material as described above is extremely effective and, in particular, it can be said to be essential in terms of obtaining large-size FRP mouldings using a phenolic resin.

In order to construct the FRP roofing material as a whole or in order to construct a roof structure, it is also possible to employ a configuration with the sandwich panels joined together. When joining together roofing materials, in the case of a metal roof there are used mechanical connection methods such as ordinary bolt connection. However, the present inventors have now discovered an FRP roofing material joint structure which is obtained by providing an FRP connecting layer extending across the two end regions and by providing a layer containing a resin distribution medium between the abutting end faces, when butt joining a core material and FRP sheets arranged at the faces thereof.

This resin distribution medium can be composed of a reticular body, or it can be composed of a block or sheet shaped body having a resin inlet hole and, furthermore, having resin flow channels formed in the surface. It is preferred that an FRP layer also be provided around this resin distribution medium.

Connection can be effected by directly providing an FRP connecting layer on one or on both faces of the two end regions of the adjacent sandwich structures but the FRP connecting layer(s) can also be arranged in hollow regions formed at the surface of these two end regions, to produce a structure where the surface of the FRP connecting layer is substantially co-planar with the sandwich structures adjacent to these hollow regions.

The method of joining FRP roofing materials relating to the present invention comprises a joining method which is characterized in that, when butt joining the ends of sandwich structures where FRP skin sheets are arranged on both faces of a core material, as well as arranging a resin distribution medium between the abutting ends, reinforcing fibre is arranged across the surface of the two ends, the resin distribution medium and the region of arrangement of the reinforcing fibre then being covered with an airtight material and the interior placed under vacuum, after which resin is injected into the resin distribution medium region and, as well as distribution of the resin taking place as far as the reinforcing fibre regions, impregnation of the reinforcing fibre takes place, and then, by curing the resin, the end regions are integrally joined together.

In the sandwich structure relating to the present invention as described above, the ends of adjacent sandwich structures are joined together by means of an FRP connecting layer which extends across the two ends on one side or on both sides thereof, and by means of a layer containing a resin distribution medium provided between the abutting end faces. Since there is no need to provide bolt holes as in conventional bolt coupling methods, there is no lowering of the strength and rigidity of the sandwich structure and, furthermore, as well as there not being any bolt holes, the joining is performed basically using an identical material, so there is no dramatic change in rigidity and stress concentrations are avoided. Furthermore, production costs are low since there is no need to reinforce the FRP skin sheets. Again, since there are no exposed bolt head regions, the appearance is good and there is no need for supplementary members such as covers, etc.

Moreover, in the method of joining FRP roofing materials relating to the present invention, the resin travels to the required sites rapidly and efficiently via a resin distribution medium, to impregnate the reinforcing fibre, and a prescribed joint can be formed, so the ends of the sandwich structures can be firmly and integrally connected together. This method of joining can be employed locally just at the position of the joint and it can be carried out easily on-the-spot.

EXAMPLES

Below, preferred practical forms of the present invention are explained with reference to the examples.

FIG. 1 shows a partial sectional view of FRP roofing material relating to a first embodiment of the present invention. In FIG. 1, FRP roofing material 1 has a rib structure 4 which joins together a pair of FRP sheets (skin layers) 3a, 3b arranged in parallel at a gap 2. In this practical embodiment, the rib structure 4 is also composed of FRP. However, it is possible for rib structure 4 to be composed of some other material such as metal or wood. Whatever material the rib structure 4 is composed of, it is desirable that the arrangement and incorporation thereof be carried out at the same time as the moulding of FRP sheets 3a, 3b.

Figure 2:
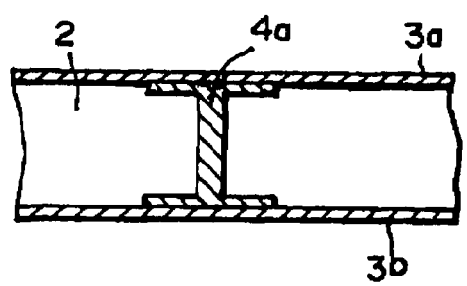
Figure 2:
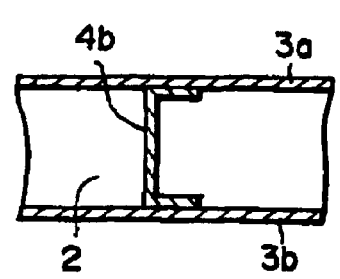
Figure 2:
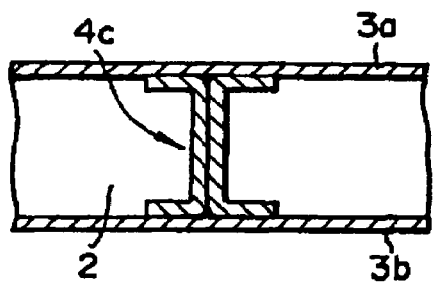
Figure 2:
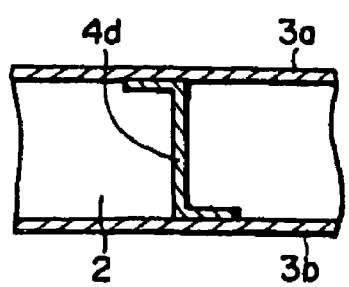
Figure 2:
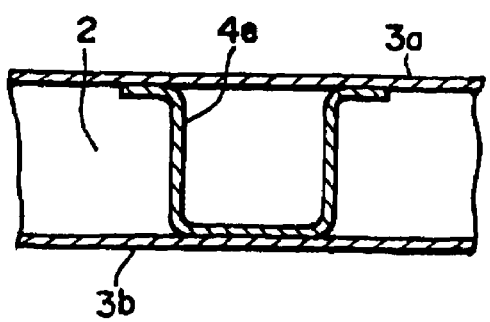

Various shapes can be adopted as the sectional shape of the rib structure. FIG. 1 shows the cross-sectional shape of a rib structure 4 which simply extends vertically but various other shapes can be employed as shown in FIG. 2 for example. In the structure shown in FIG. 2(A), the rib structure 4a has an I-shaped or H-shaped cross section; in the structure shown in FIG. 2(B), the rib structure 4b has a C-shaped cross-section; in the structure shown in FIG. 2(C), the rib structure 4c has a back-to-back arrangement of C-shaped rib structures; in the structure shown in FIG. 2(D), the rib structure 4d has a cross-section with a hook shape or connecting member shape; and in the structure shown in FIG. 2(E), the rib structure 4 has a hat shaped cross-section. Rib structures of these different cross-sections can be selected in accordance with the site of the FRP roofing material and can also be used in combination.

The arrangement position and pitch/frequency of the rib structures 4 are important factors in determining the physical properties of the FRP roofing material of the present invention, in particular the flexural rigidity. Normally, in order to be favourably employed as a roofing material, it is preferred that the flexural rigidity per unit width (1 mm) of roofing material be at least $5 \times 10^7$ kg·mm$^2$.

Figure 3:
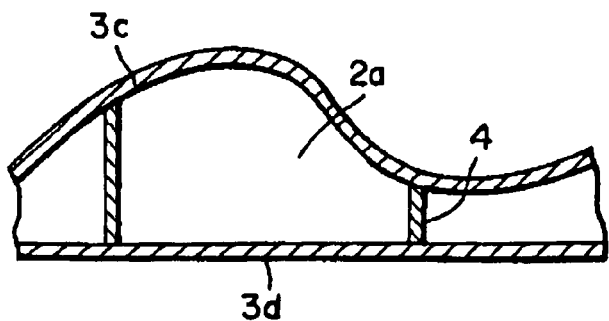

In the FRP roofing material relating to the present invention, as shown in FIG. 1 and FIG. 2, the dimension (the vertical dimension in the figures) of the gap formed between the pair of FRP sheets 3a, 3b can be constructed to be substantially fixed in the lengthwise direction of the sheets. Furthermore, construction may also be such that the dimension of the gap varies in the lengthwise direction. For example, as shown in FIG. 3, viewed in cross-section, by having a form in which one sheet 3c varies in a curved fashion while the other sheet 3d extends linearly, it is possible to continuously vary the dimension of the gap 2a between the pair of sheets 3c, 3d.

Figure 4:
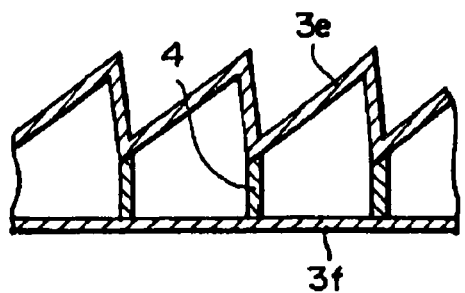

Hitherto, in order to raise the strength and rigidity, a jagged member has sometimes been used as a roofing material, and this form can also be employed in the same way in the present invention. For example, as shown in FIG. 4, viewed in cross-section, there can be employed a form in which one sheet 3e is moulded in a sharp jagged form with peaks and troughs arranged in alternating fashion, while the other sheet 3f extends linearly. In the structure shown in aforementioned FIG. 3, sheet 3d at the underside in the figure may also be formed in a shape which changes in a curved fashion and, in the structure shown in FIG. 4, sheet 3f on the underside in the figure may also be formed with a jagged shape.

Figure 5:
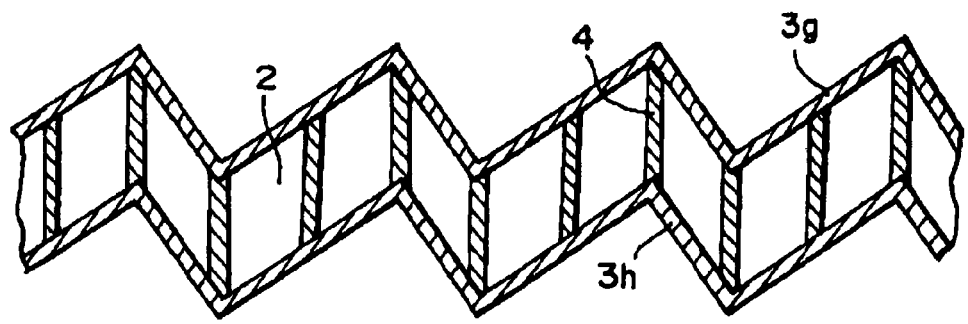

Furthermore, as shown in FIG. 5, the pair of sheets 3g, 3h may both be given a jagged or zigzag shape, with these being arranged such that essentially a fixed gap 2 is maintained between them.

Figure 6:
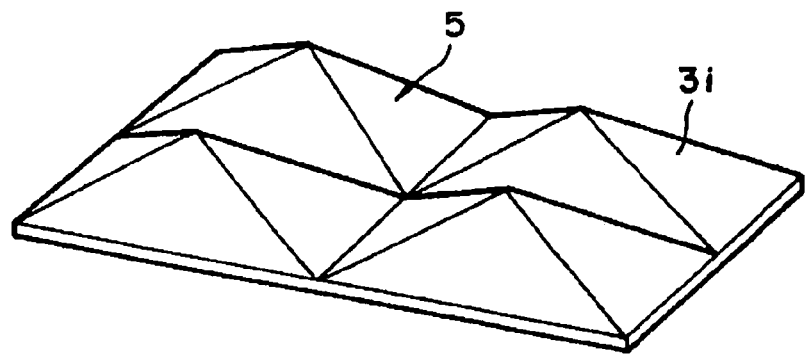

Moreover, it is possible to magnify three-dimensionally the projecting/indented form of an aforesaid FRP sheet. For example, as shown in FIG. 6, there may be produced a structure where FRP sheet 3i has pyramid shaped projections or indentations, and these projecting or indented regions 5 may be provided on their own or a number may be provided together. These projecting or indented regions 5 may also be formed with a curved face (three-dimensional curved surface).

In this way, by forming the surface of the roofing material from an FRP sheet, moulding in almost any shape is possible, so design limitations are markedly reduced and the design characteristics considerably enhanced. Moreover, any desired shape can be realized cheaply.

In the aforesaid practical embodiments, the gap 2 between the pair of sheets has the form of an empty space but a filler material of specific gravity lower than that of the pair of sheets may also be arranged in this gap 2. By employing a low specific gravity filler in this way, it is possible to further raise the strength and rigidity, or to enhance the thermal insulation, without impairing the lightness of the roofing material as a whole. Moreover, it is possible to maintain a prescribed cross-sectional shape still more reliably.

Figure 7:
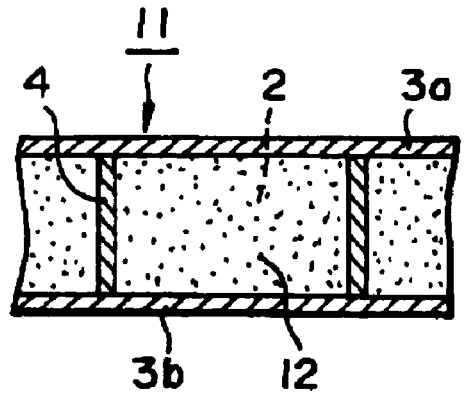

As shown in FIG. 7 for example, this filler material functions as the core material 12 of FRP roofing material 11 constructed as a sandwich structure.

Figure 8:
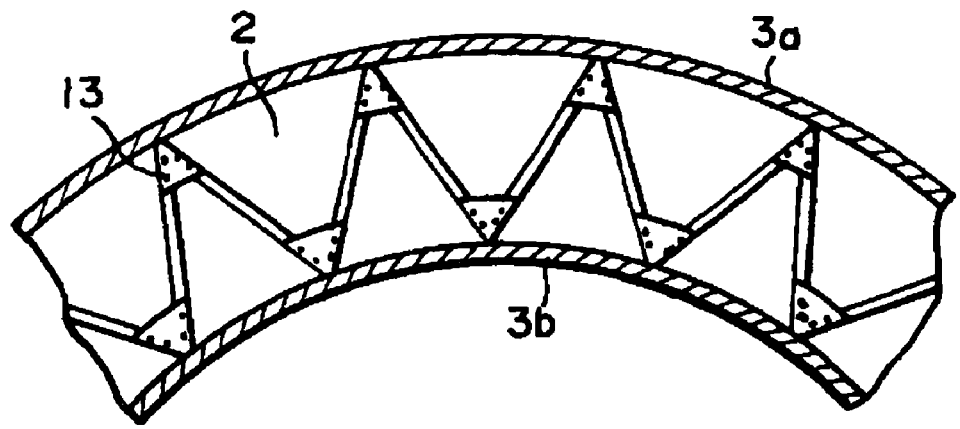

Again, it is also possible to arrange a truss or rigid frame (Rahmen) structure as the rib structure between the pair of sheets in the FRP roofing material relating to the present invention. For example, FIG. 8 shows a construction where a rigid frame structure 13 is arranged in the gap 2 between the pair of sheets 3a, 3b. By means of the rigid frame structure 13, the sheets 3a, 3b are extremely firmly joined together and variations in the space between the sheets are suppressed. For this rigid frame structure 13 or for the truss structure, there can be used FRP or a material such as metal or wood.

When employing the FRP roofing material, it is preferred that a connecting member for connection to another member (other structural member) be fitted to the outer face of at least one of the sheets of the FRP roofing material. In order to maintain the prescribed cross-sectional shape of the FRP roofing material, it is preferred that this connecting member be fitted at a position which corresponds to the position where a rib structure is provided.

Figure 9:
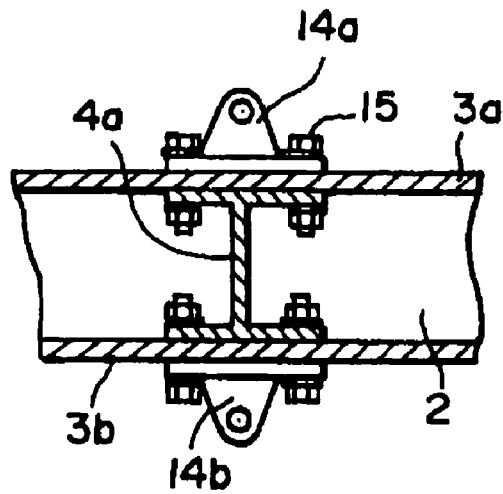
FIGS. 9-11 show examples where connecting members are fitted to the outer surfaces of sheets corresponding to the position of arrangement of the rib structures.

As shown in FIG. 9, for example, connecting members 14a, 14b are fitted to the outer face of sheet 3a and the outer face of sheet 3b corresponding to the arrangement position of rib structure 4a. Fitment may be by a method of adhesion to the outer face of the sheet or by a method of integrally moulding to the sheet, and it is also possible to carry out fitment by through-bolts or the like.

Figure 10:
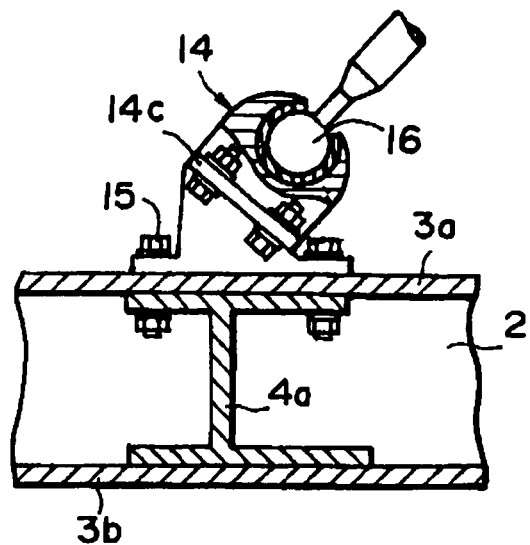

Again, as shown in FIG. 10, in order to prevent torsion, it is preferred that the connecting member 14 has a universal joint 16 which permits rotation not just in one direction but in many directions. By employing universal joint 16, as well as fitment and deployment of the FRP roofing material being facilitated, it is possible to prevent the occurrence and transmission of undesirable stresses such as torsional stress. Now, with the universal joint 16 shown in FIG. 10, the rotation range is somewhat narrow, so an auxiliary sloping base 14c is also employed, but depending on the angle of use this need not necessarily be employed.

Figure 11:
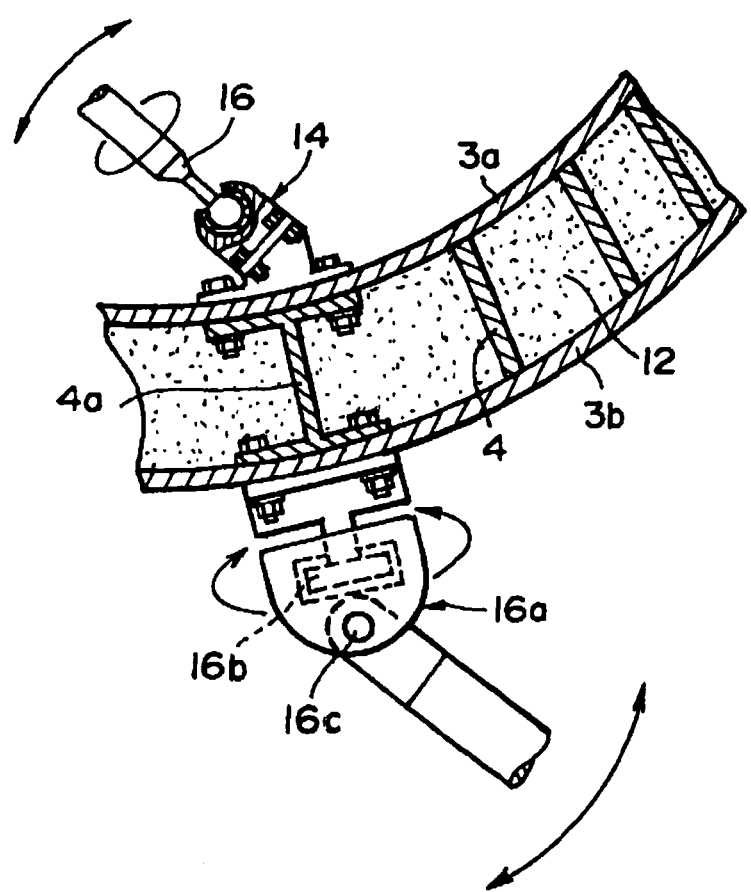

FIG. 11 illustrates an example of a preferred embodiment where the aforesaid universal joint 16 is used and where there are arranged rib structures 4, 4a of shape corresponding to their position in the FRP roofing material (a plurality of rib structures is arranged mixed together) and, moreover, where a core material 12 comprising a foam is also used. In the example shown in FIG. 11, as the underside universal joint 16a, there is used a type having two pins 16b, 16c extending in mutually perpendicular directions.

Again, in the FRP roofing material relating to the present invention, there may be provided openings which pass right through in the thickness direction, for forming windows or ventilation holes.

Figure 12:
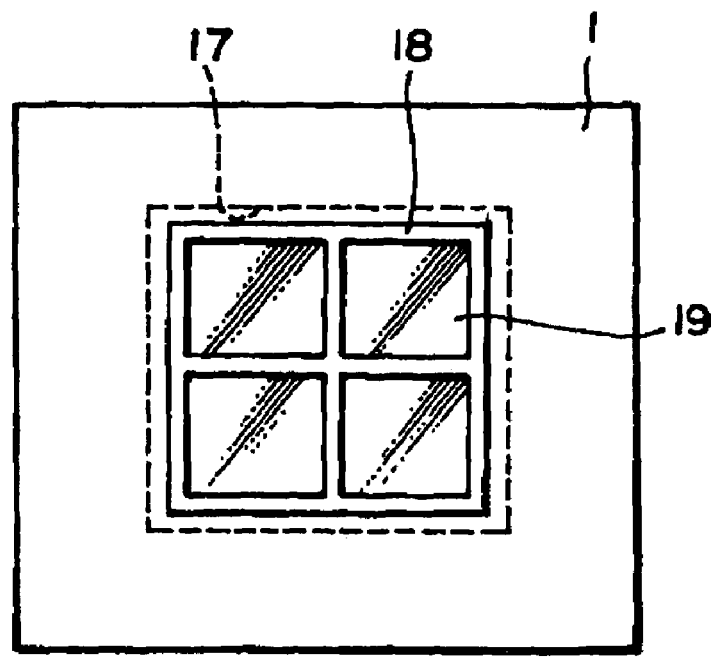
FIGS. 12 and 14 show examples where an opening has been formed in the FRP roofing member and a window frame member has been fitted.

For example, as shown in FIG. 12, by forming beforehand an opening 17 which passes through FRP roofing material 1 in the thickness direction, it is possible to produce a structure for fitting a window frame member 18 in said opening 17. Window glazing 19 comprising a transparent material such as acrylic, glass or polycarbonate is inserted in window frame member 18. This window frame member 18 may be of the same material as the rib structure and/or of the same arrangement, and following separate construction can be joined to the FRP roofing material.

Furthermore, in the case of the FRP roofing material relating to the present invention, it is possible to produce a structure where a fire-resistant material is provided on at least one side face in order to raise the fire resistance.

Figure 13:
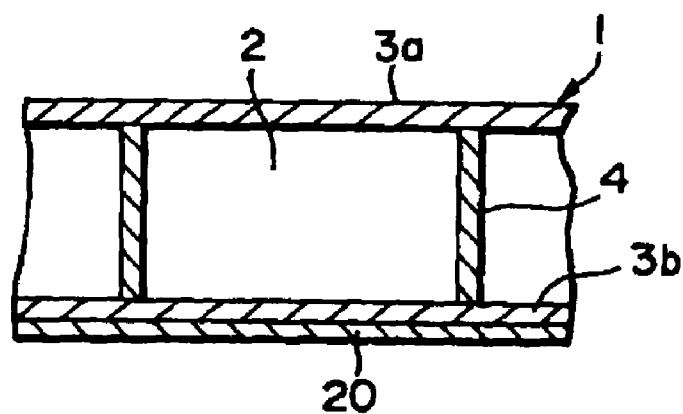
FIG. 13 shows an example where a fire-resistant layer has been provided on one face of the FRP roofing material.

For example, as shown in FIG. 13, it is possible to provide a fire-resistant layer 20 on one face of FRP roofing material 1. As the fire-resistant material, there can be used a blanket-shaped material of inorganic fibre such as rock wool fibre or ceramic fibre, or there can be used a phenolic foam, a hardened sheet of rock wool, a fire-resistant coating or a foamable fire-resistant plastic, etc.

Figure 14:
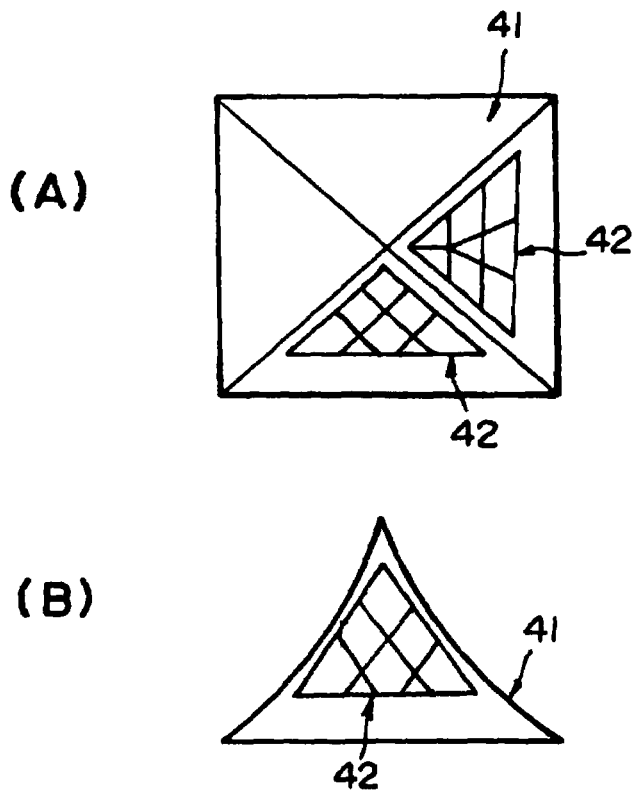
Figure 15:
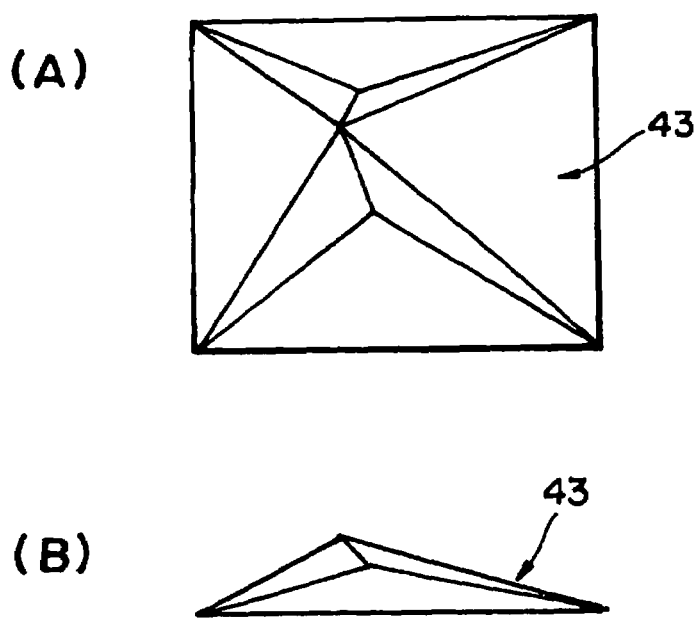
FIG. 15 shows an example of FRP roofing material having a more complex shape, where faces are combined at a desired angle.
Figure 16:
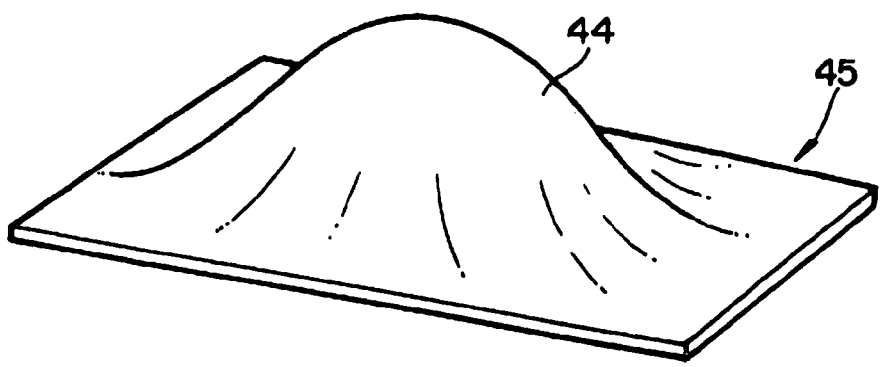
FIG. 16 shows an example of FRP roofing material having a non-planar portion with a three-dimensional curved surface.

As explained above, the FRP roofing material relating to the present invention can be freely moulded in various three-dimensional shapes. For example, as shown in FIG. 14, it can be moulded in the form of a polyhedral (in the illustrated example, a quadrangular pyramid shaped) FRP roofing material 41, to give a structure in which window frame members 42 are fitted at desired faces (at two faces in the illustrated example), or an FRP roofing material 43 of still more complex shape can be constructed by combining faces at desired angles as shown in FIG. 15. Furthermore, it is also possible to construct an FRP roofing material 45 with a non-planar portion having a three-dimensional curved surface 44, as shown in FIG. 16.

Figure 17:
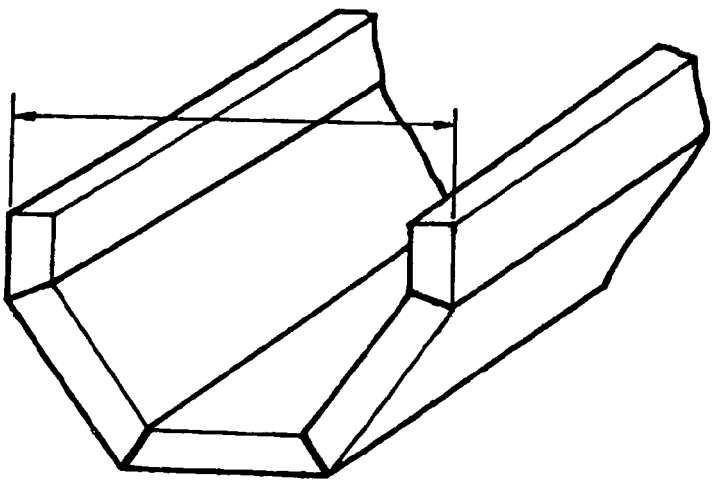
FIGS. 17, 18 and 19 show other embodiments of the FRP roofing material.
Figure 18:
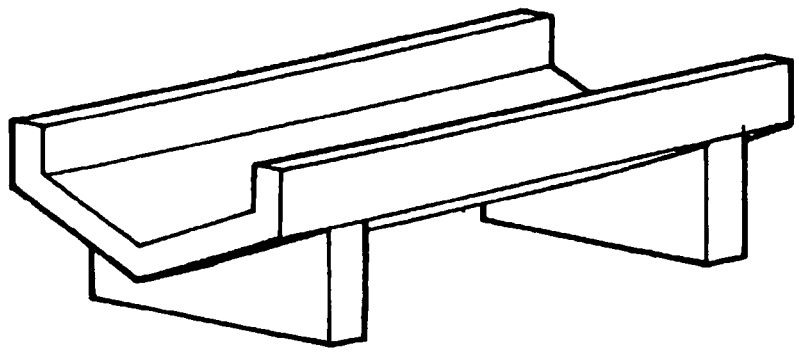
Figure 19:
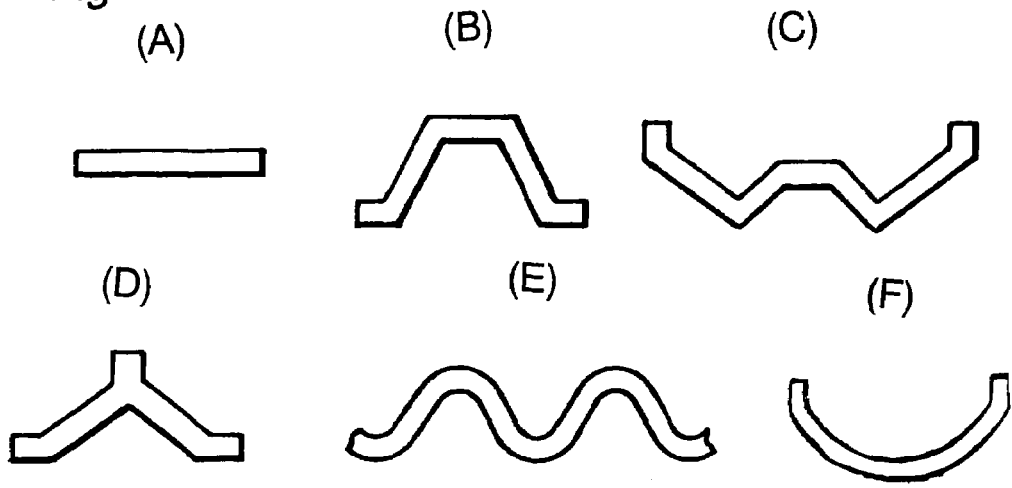

Again, the FRP roofing material relating to the present invention can have a structure as shown in FIG. 17 or FIG. 18, or a cross-sectional shape as shown in FIG. 19 (A) to (F). In the case of such roofing materials which are long in one direction, it is possible to link together a number in their widthwise direction to produce the roofing material.

Figure 20:
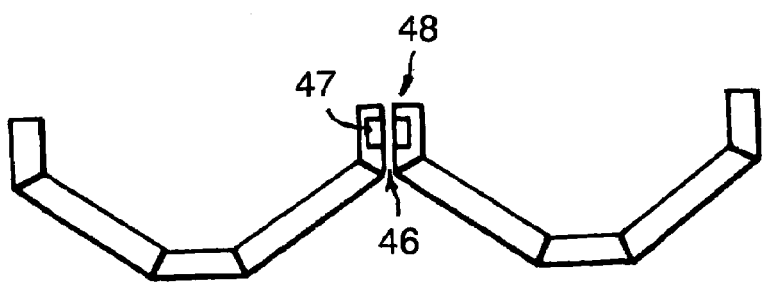
FIG. 20 shows an example where FRP roofing materials have been connected via a connecting member (e.g. a bolt).

With regard to the linkage structure, mutually adjacent FRP roofing materials can be linked together via suitable linking members (e.g. bolts) at a specified gap 46, as shown for example in FIG. 20. By forming such a gap 46, it is possible to absorb dimensional errors in one of the FRP roofing materials 1 or errors at the time of assembly, and it is also possible to absorb changes due to thermal expansion or contraction of the roof according to whether or not the sun is shining, etc.

Figure 21:
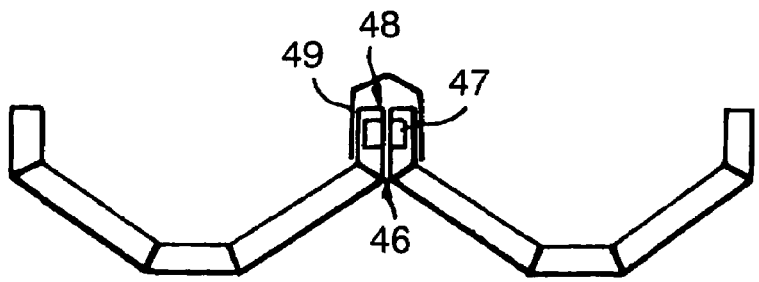
FIG. 21 shows a connecting region which has been given a waterproof construction by covering with a waterproof member.

As shown in FIG. 21, a linked region 48 of this kind can be covered with a waterproof member 49 comprising a waterproof sheet material or the like, to readily achieve a waterproof structure and readily prevent leakage of rainwater and the like.

Figure 22:
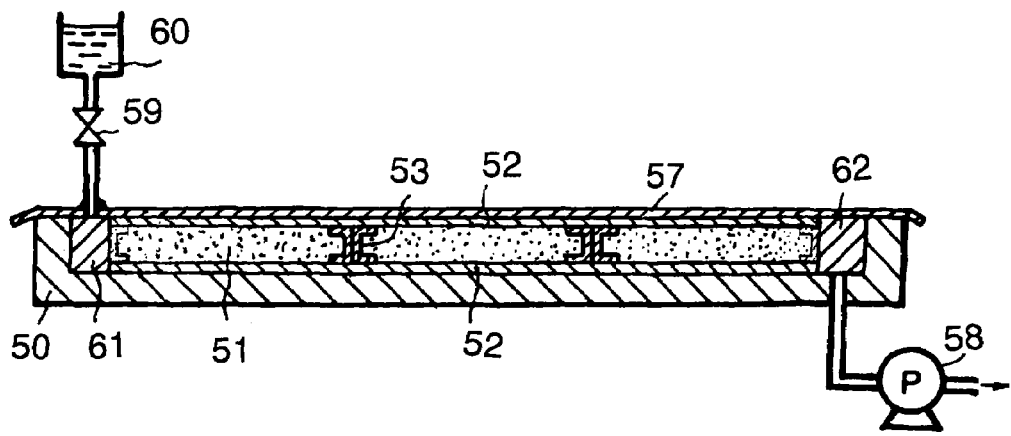
FIG. 22 shows an example of the integral moulding of FRP roofing material relating to the present invention.

This FRP roofing material relating to the present invention, even where of large size, can readily be integrally moulded by the following method using a specified mould, or the like. FIG. 22 illustrates an example of integral moulding relating to the present invention, and in order to simplify explanation there is shown the case of FRP which is entirely flat but, by changing the moulding tool, moulding is possible in any desired shape.

In the method illustrated in FIG. 22, there are arranged in mould 50 a plurality of core materials 51 comprising a foam material or the like and, furthermore, reinforcing fibre substrates 52 are arranged at both faces thereof. In this practical embodiment, the core materials 51 are arranged lengthwise and crosswise viewed in planar fashion. The ends of the arranged core materials 51 may be disposed so that aforesaid fibre reinforcing substrate 52 envelops core material 51, or as shown in FIG. 22 there may be arranged ⊃-shaped cap-shaped reinforcing fibre substrates 53.

Figure 23:
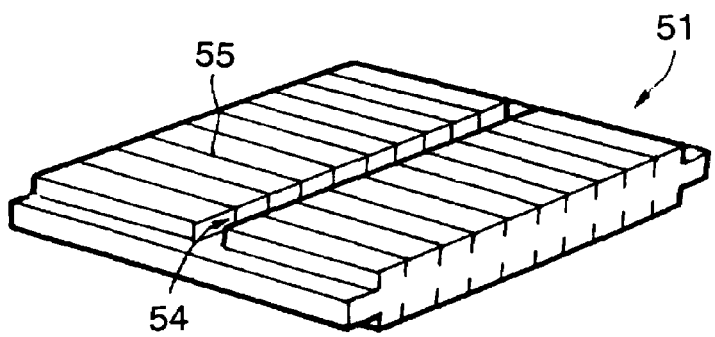
FIGS. 23 and 24 show examples of the core member construction.

Each of the core materials is constructed as shown in FIG. 23, for example. Core material 51 has channels 54 forming resin passageways and numerous channels 55 branching from these channels 54. Now, in such circumstances, the cross-sectional areas of the channels 54 and 55 need not necessarily be different. The resin is transmitted in the direction of the face of the reinforcing fibre 52 via these channels 54, 55, and the transmitted resin impregnates the reinforcing fibre 52 in the thickness direction.

Figure 24:
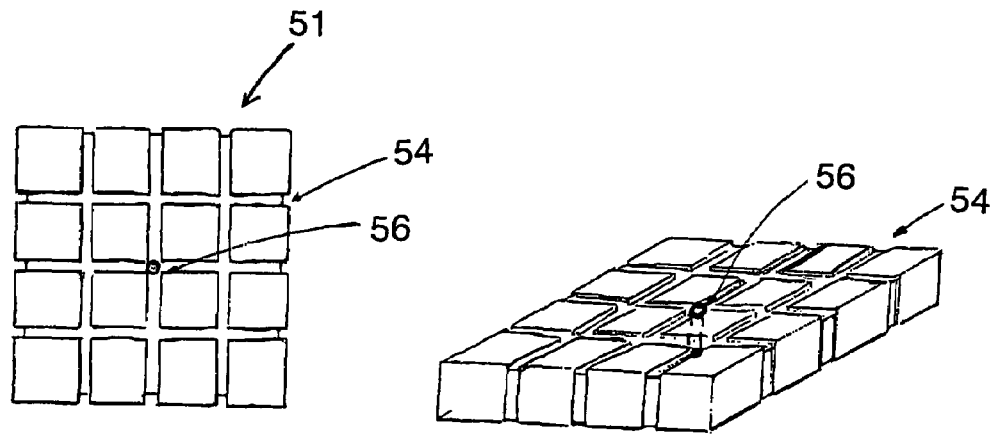

For the purposes of resin impregnation, and in particular in order to eliminate un-impregnated regions at the moulding tool face, through-holes 56 may be provided in the core material as shown in FIG. 24. Because there is direct injection of the resin at the lower face of the core material in this way, it is possible to prevent the un-impregnated regions which arise primarily at the moulding tool face side, and it is possible to produce FRP roofing materials of stable properties and good product quality.

By covering the upper face side of the aforesaid reinforcing fibre substrate 52 with an airtight material 57 and then applying suction to the interior by means of vacuum pump 58, a state of vacuum is produced. Next, valve 59 is opened and liquid resin 60 is injected into the interior of mould 50 which is under vacuum as aforesaid. The injection is carried out, for example, via an edge breather 61 comprising, for example, a porous material, and the suction to pump 58 is also carried out via a similar edge breather 62. The resin injection position, the suction position, and the position of the edge breathers 61, 62 may be suitably altered. For example, it is also possible to inject the resin from the centre region of the FRP roofing material. Again, in this embodiment the upper face of the reinforcing fibre substrate 52 is directly covered with airtight material 57 but, optionally, there may be interposed a release material which is then separated off after the moulding. In the above embodiment the airtight material 57 itself functions as a release material. As the optionally-provided release material, there is preferably employed a release material through which the resin can pass but, after curing, can then be stripped away from the FRP structure (for example a nylon taffeta, polyester taffeta or the like).

The injected resin passes through the channels 54, 55 or the through-holes 56 as described above and, while being rapidly transmitted towards the surface of the fibre reinforcing substrate 52, gradually impregnates the reinforcing fibre substrate 52 in the thickness direction. At this time, the ⊃-shaped reinforcing fibre substrates 53 which form the rib structures are, simultaneously impregnated with resin and the rib structures are integrally moulded.

The impregnated resin hardens at room temperature, or in certain cases it is cured by heating, and the FRP roofing material is completed. Following curing, the airtight material 57 is removed and the hardened FRP structure is removed from the mould 50. In this way, the FRP roofing material is integrally formed.

Furthermore, a practical embodiment of the FRP roofing material of the present invention is explained below using the drawings.

Figure 25:
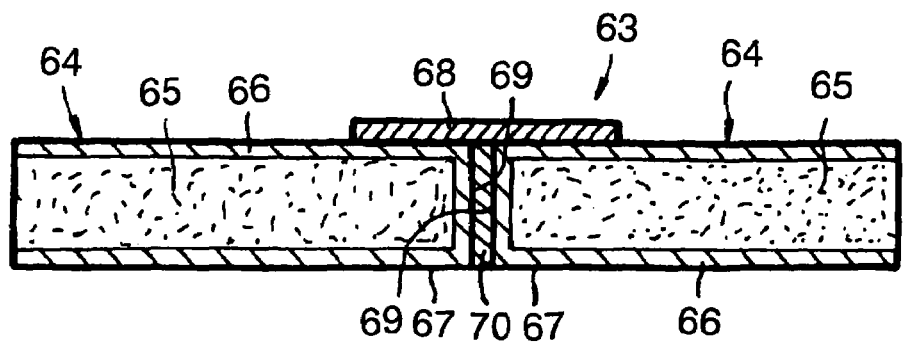
FIG. 25 shows an example of the cross-section of the FRP roofing material joint structure.

FIG. 25 shows a cross-section of the FRP roofing material joint construction. 63 denotes the joined FRP roofing materials, and 64 denotes the individual FRP roofing materials which are mutually joined together. Each of the FRP roofing materials 64 comprises FRP skin sheet 66 arranged on both faces of core material 65, with these being integrally moulded together. In this embodiment, at the end regions the FRP skin sheet 66 is arranged so that it is continuously wrapped round from the surface on one side, to that on the other.

Over the surfaces of the two ends 67 of the abutting adjacent FRP roofing materials 64, there is provided FRP connecting layer 68 which extends across the surfaces of the ends 67 on one face, and the FRP connecting layer 68 and the FRP sheet 66 of each of FRP roofing materials 64 are integrally joined. In this embodiment, the FRP connecting layer 68 is provided only on one face but it may also be provided on both faces as shown in undermentioned FIG. 30.

A layer 70 containing a resin distribution medium is provided between the abutting end faces 69 of the adjacent FRP roofing materials 64 and, by means of the injected and cured resin, this layer 70 is integrally coupled to both abutting end faces 69.

Figure 26:
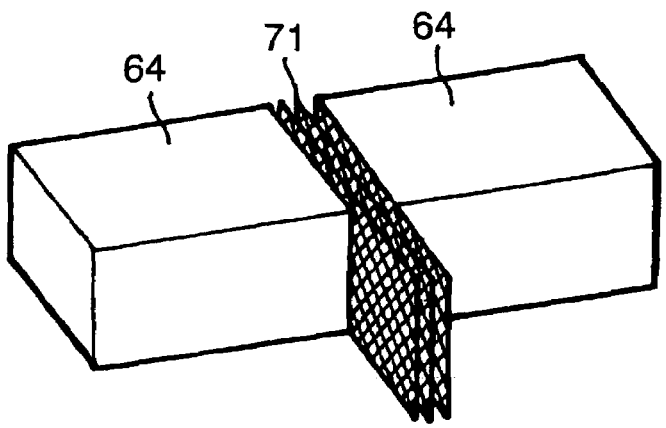
FIG. 26 shows an example where the injected resin is distributed between two abutting end faces via a resin distribution medium consisting of a reticular body.
Figure 27:
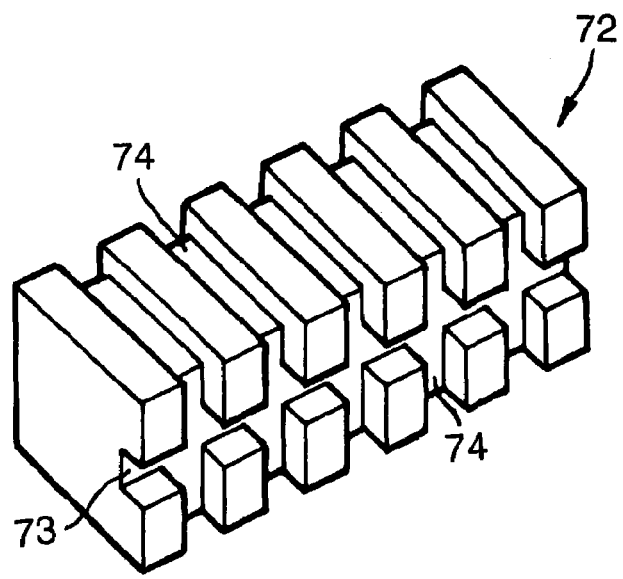
FIG. 27 shows an embodiment having a resin distribution medium comprising a block body, a resin injection hole and resin flow channels.

The resin distribution medium contained in the aforesaid layer 70 is constructed as shown, for example, in FIG. 26 or FIG. 27, in terms of its shape prior to the resin injection. In the embodiment shown in FIG. 26, by interposing a resin distribution medium 71 comprising a reticular body, it is possible to bring about distribution of the injected resin between the abutting end faces 69 and in the direction of aforesaid FRP connecting layer 68. With regard to the FRP connecting layer 68, at the time of moulding there is firstly arranged a layer comprising reinforcing fibre and this is impregnated by the resin which is distributed via resin distribution medium 71, thereby forming FRP connecting layer 69.

In the embodiment shown in FIG. 27, construction is performed by means of a resin distribution medium 72 which comprises a block, and this resin distribution medium 72 has a resin inlet hole 73 and also possesses resin flow channels 74 comprising grooves which extend lengthwise/widthwise and/or extend in a peripheral direction. In this way, the resin injected from resin injection hole 73 flows through the resin flow channels 74 and is transmitted to specified sites. The example of the resin distribution medium illustrated in FIG. 27 is that of a block but it may also have the form of a sheet.

Figure 28:
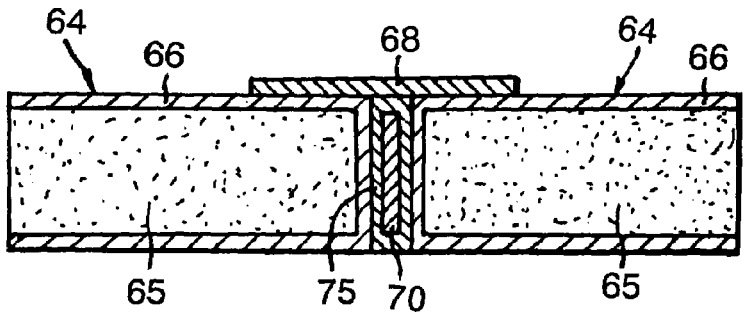
FIGS. 28, 29 and 30 show examples of FRP connecting layers.

Again, as shown in FIG. 28, an FRP layer 75 may also be provided around the aforesaid resin distribution medium or the layer containing the resin distribution medium. This FRP layer 75 can be constructed naturally at the time of the resin injection and joint formation by arranging beforehand, around the resin distribution medium, the reinforcing fibre used for constructing FRP layer 75, prior to the injection into the resin distribution medium.

Figure 29:
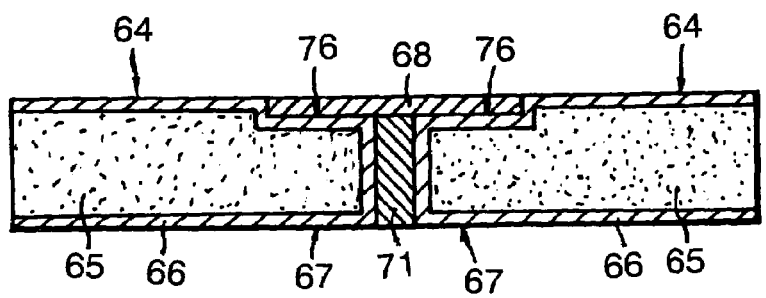

Furthermore, as shown in FIG. 29, by forming beforehand hollow regions 76 at the surface of the two ends 67 of the adjacent FRP roofing materials 64, it is possible to arrange FRP connecting layer 68 within the hollow regions 76 so that it stretches across both hollow regions 76. In this way, as shown in the figure, the surface of the FRP connecting layer 68 can be made substantially coplanar with the surface of the FRP roofing materials 64 outside of the hollow regions 76.

Figure 30:
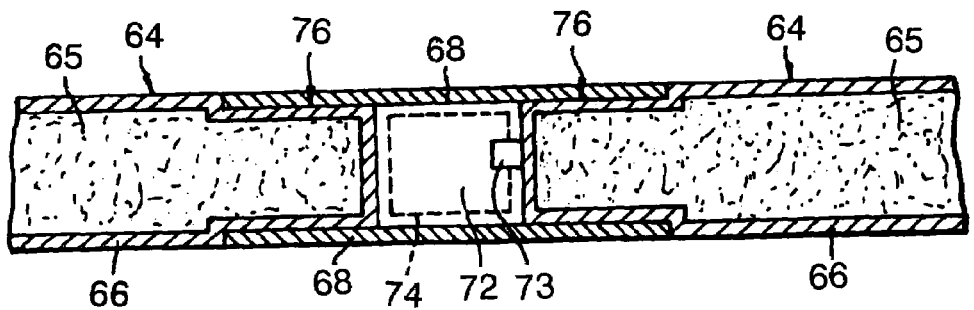

FIG. 30 shows an example where there is adopted a structure in which the FRP connecting layer 68 is arranged inside hollow regions 76 as shown in FIG. 29, and a structure employing a resin distribution medium 72 as shown in FIG. 27, together with a structure in which FRP connecting layers 68 are arranged on both end faces.

The aforesaid FRP roofing joint structure 63 relating to the present invention can be produced for example in the following manner. At the time of the butt joining of the ends 67 of FRP roofing materials 64, a resin distribution medium 71 (or 72) is arranged between the abutting end faces 69 and, optionally, reinforcing fibre may be wound around the outside of said resin distribution medium 71. Again, either on one face or on both faces, reinforcing fibre is arranged extending across between the surfaces of the ends 67 of the FRP roofing materials 64, or extending between hollow regions 76 formed therein. The entire joint region is then covered with a sealable airtight material and suction applied to the interior with a vacuum pump to form a vacuum, after which resin is injected into the resin distribution medium 71 portion. Because of the vacuum state, the injected resin is distributed rapidly and, as well as spreading between the abutting end faces 69, it is also distributed to the aforesaid reinforcing fibre layer(s) arranged at the surface, and so there is simultaneous impregnation of the reinforcing fibre layer(s). In the case where reinforcing fibre has been wound around the resin distribution medium 71, there is also distribution into and impregnation of this reinforcing fibre. By curing the injected resin, FRP connecting layer(s) 68 is/are constructed from the reinforcing fibre layer(s) arranged at the surface and the impregnated resin and, along with the cured resin between the abutting end faces 69, the two FRP roofing material 64 are integrally connected.

In the FRP roofing material joint structure obtained by the aforesaid joining method, there is basically no need for bolt holes in the joint region, so there is no lowering of the inherent strength and rigidity of the FRP roofing material 64. Again, since it is possible to carry out the joining using substantially the same type of FRP material and the same type of resin at the FRP roofing material 64 surface regions and in the region between the abutting end faces 69, the coupling characteristics are extremely good, there is no dramatic change in rigidity and stress concentrations can be avoided.

Industrial Utilization Potential

As explained above, in accordance with the FRP roofing material joint construction of the present invention, it is possible to offer a roofing material of extremely high utility, where there is no fear of rusting, and which, while being light in weight, has sufficiently high strength and rigidity, can exhibit good thermal insulation and can also contribute to an enhancement in the earthquake resistance of the building and, moreover, which can be readily moulded to any highly designed shape.

Where a phenolic resin is used as the matrix resin of the FRP, or if a fire-resistant material is provided at the surface, it is possible to produce a roofing material which is outstanding in it fire-resistance.

Furthermore, in accordance with the method of producing the FRP roofing material of the present invention, even large FRP roofing materials with the aforesaid outstanding properties can be essentially integrally moulded, and it is possible to produce a desired FRP roofing material easily and cheaply.

Moreover, in accordance with the FRP roofing material joint structure of the present invention, the problems of conventional joint structures can be completely overcome, and the ends of the sandwich structures can be easily, firmly and cheaply joined together and, as well as ensuring high joint strength and rigidity, an excellent appearance can be achieved.

Furthermore, in accordance with the method of joining of the present invention, since the joining can be carried out easily and cheaply, on-site joining operations are facilitated.

What is claimed is:

1. A fibre reinforced plastic roofing material comprising two or more sandwich structures each having a length of from 10 m to 25 m and a width of from 1.5 m to 3.5 m and comprising a pair of fibre reinforced plastic sheets arranged with a gap therebetween, and a rib structure interposed in the gap between the pair of sheets which is integrally molded by a resin transfer molding, wherein the fibre reinforced plastic includes a reinforcing fibre that is selected from the group consisting of a carbon fibre, a glass fibre and carbon fibre hybrid, and combinations thereof, and wherein the two or more sandwich structures are butt joined in the widthwise direction by being integrally molded by a resin transfer molding with a layer containing a resin distribution medium comprising a body having resin flow channels formed therein and a fiber reinforced layer placed between abutting end surfaces of said sandwich structures and, wherein the layer extends across the surfaces of both ends of said sandwich structures.

2. A fibre reinforced plastic roofing material according to claim 1, wherein the pair of sheets have a thickness of from 2–10 mm.

3. A fibre reinforced plastic roofing material according to claim 1, wherein the rib has a thickness of from 1–3 mm.

4. A fibre reinforced plastic roofing material according to claim 1, wherein the reinforcing fibre of the fibre reinforced plastic comprises a multiaxial woven material having a fibre direction at an angle of 45±10° to the lengthwise direction of the rib structure.

5. A fibre reinforced plastic roofing material according to claim 1, wherein the fibre reinforced plastic is carbon fibre reinforced plastic.

6. A fibre reinforced plastic roofing material according to claim 1, wherein the fibre reinforced plastic is a hybrid fibre reinforced plastic of carbon fibre and glass fibre.

7. A fibre reinforced plastic roofing material according to claim 1, wherein the reinforcing fibre is a woven material.

8. A fibre reinforced plastic roofing material according to claim 7, wherein the woven material is a plain weave or twill weave.

9. A fibre reinforced plastic roofing material according to claim 1, wherein the gap provides a uniform spacing along the lengthwise direction of the sheets.

10. A fibre reinforced plastic roofing material according to claim 1, wherein the gap provides a spacing that varies along the lengthwise direction of the sheets.

11. A fibre reinforced plastic roofing material according to claim 1, wherein there is arranged, in the gap, a filler having a specific gravity lower than the specific gravity of each pair of sheets.

12. A fibre reinforced plastic roofing material according to claim 1, wherein at least one of the sheets has a jagged form in which there are alternatively arranged peaks and troughs.

13. A fibre reinforced plastic roofing material according to claim 1, wherein a rigid frame structure is arranged in the gap.

14. A fibre reinforced plastic roofing material according to claim 1, wherein a connecting member for connecting to another member is fitted to an outer face of at least one of the sheets.

15. A fibre reinforced plastic roofing material according to claim 1 wherein a ratio of the overall thickness of the sandwich structure to the thickness of each sheet is in the range 5:1 to 25:1 and the sandwich structure has a density that is no more than 100 kg/m$^2$.

16. A fibre reinforced plastic roofing material according to claim 1 wherein a flexural rigidity of the sandwich structure is at least $5 \times 10^7$ kg/mm$^2$.

17. A fibre reinforced plastic roofing material according to claim 1 wherein the fibre reinforced plastic roofing material extends in a lengthwise direction at a uniform width and has a flexural rigidity in the lengthwise direction of at least $5 \times 10^7$ kg/mm$^2$.

18. A fibre reinforced plastic roofing material according to claim 1 wherein a cross-sectional shape of the fibre reinforced plastic roofing material is selected from the group consisting of flat sheet shaped, V-shaped, hat shaped, W-shaped, inverted Y-shaped, corrugated, and circular arc shaped.

19. A fibre reinforced plastic roofing material according to claim 1 wherein a shape of the fibre reinforced plastic roof material in the lengthwise direction that is a circular arc.

20. A fibre reinforced plastic roofing material according to claim 19, wherein a gap is formed between adjacent fibre reinforced plastic roofing materials in the widthwise direction.

21. A fibre reinforced plastic roofing material according to claim 20, wherein a linked region is covered with a waterproof member.

22. A fibre reinforced plastic roofing material according to claim 1, wherein at least one of the sheets comprises a matrix resin comprising phenolic resin.

23. A fibre reinforced plastic roofing material according to claim 1, wherein a fire-resistant material is provided at least on one face of the fibre reinforced plastic roofing material.

24. A fibre reinforced plastic roofing material according to claim 23, wherein the fire-resistant material is a fire-resistant material containing rock wool.

25. A fibre reinforced plastic roofing material according to claim 23, wherein the fire-resistant material is a fire-resistant material containing phenolic foam.

26. A fibre reinforced plastic roofing material according to claim 16 wherein the thickness of a fibre reinforced plastic layer comprising carbon fibre is at least 5% of the total thickness of the fibre reinforced plastic sheet.

27. A fibre reinforced plastic roofing material according to claim 1, wherein there is a core material in the gap and there are present, in the core material, through-holes running from an upper face to a lower face.

* * * * *